United States Patent [19]
Hutchison et al.

[11] 3,963,654
[45] June 15, 1976

[54] IMPRESSION MATERIAL FOR USE IN AN IMPRESSION PACKER

[75] Inventors: Stanley O. Hutchison, Bakersfield; Glenn W. Anderson, Oildale; Gordon L. Newby, Bakersfield, all of Calif.

[73] Assignee: Chevron Research Company, San Francisco, Calif.

[22] Filed: July 29, 1974

[21] Appl. No.: 492,377

Related U.S. Application Data

[62] Division of Ser. No. 373,341, June 25, 1973, Pat. No. 3,855,854.

[52] U.S. Cl. .................. 260/5; 73/151; 138/177; 260/33.6 AQ
[51] Int. Cl.² ............ E21B 47/00; C08L 7/00
[58] Field of Search ........... 73/151; 260/5, 33.6 AQ, 260/42.37; 252/8.55 R; 264/225, 337

[56] References Cited

UNITED STATES PATENTS

| | | | |
|---|---|---|---|
| 2,271,124 | 1/1942 | Juve et al. | 260/5 |
| 2,271,125 | 1/1942 | Juve | 260/5 |
| 2,870,105 | 1/1959 | Ridgway et al. | 260/33.6 AQ X |
| 3,046,601 | 7/1962 | Hubbert et al. | 73/151 |
| 3,700,690 | 10/1972 | Burke | 260/33.6 AQ |

*Primary Examiner*—Herbert B. Guynn
*Attorney, Agent, or Firm*—R. L. Freeland, Jr.; Edward J. Keeling

[57] ABSTRACT

An impression packer for use in obtaining impressions in wells and having an impression sleeve formed of a mixture of partially curved synthetic nitrile rubber, natural rubber smoked sheet, silica powder and rubber processing oil.

12 Claims, 3 Drawing Figures

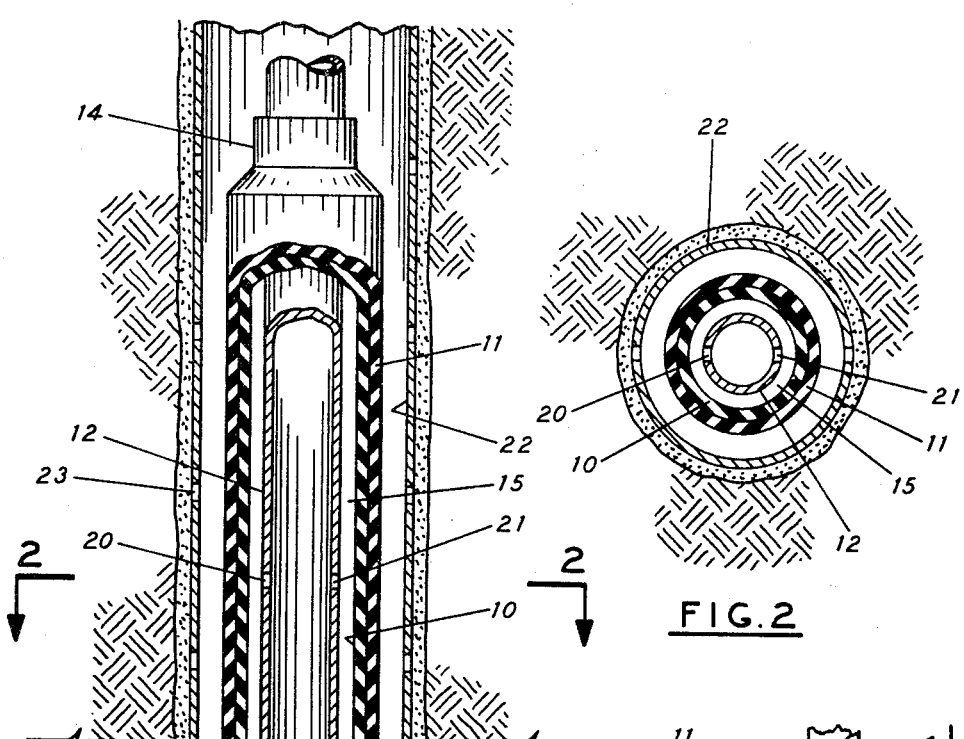
FIG.2
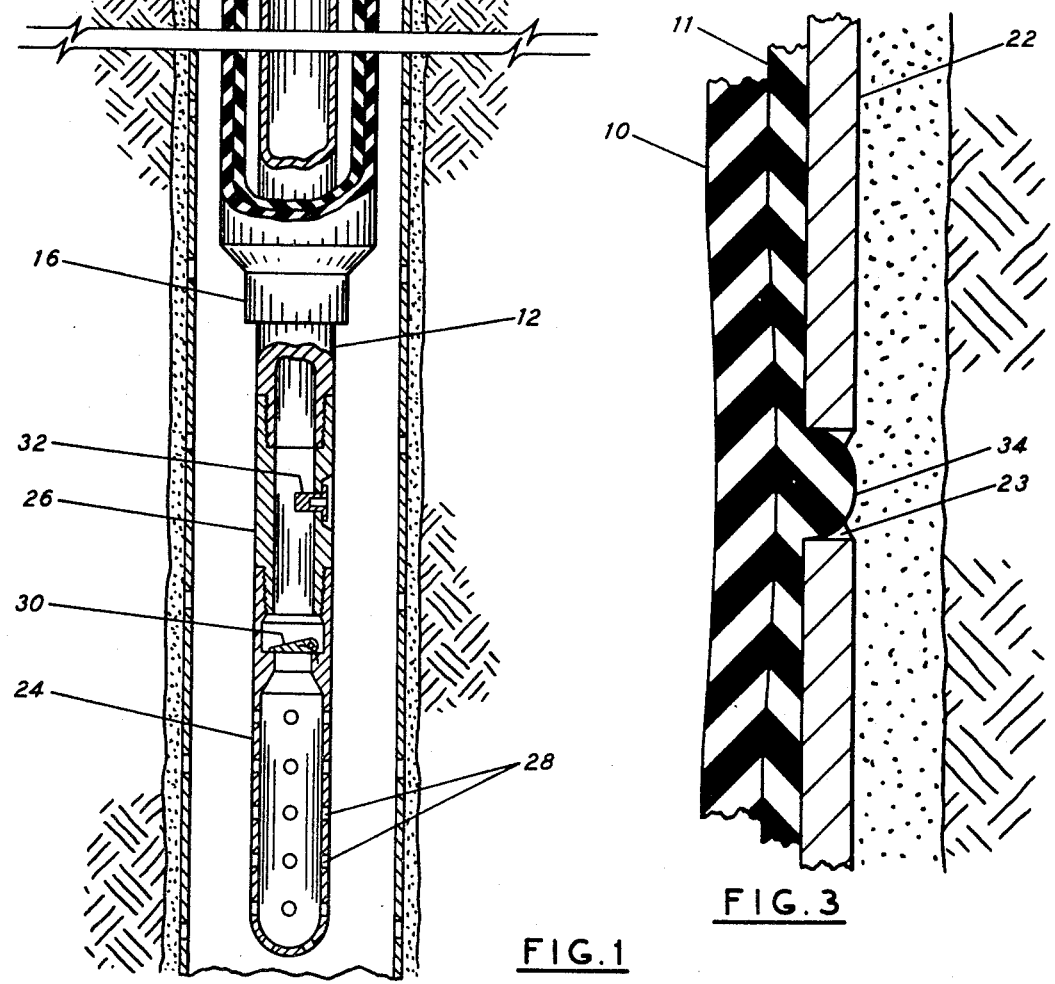
FIG.3
FIG.1

3,963,654

IMPRESSION MATERIAL FOR USE IN AN IMPRESSION PACKER

This is a division of application Ser. No. 373,341, filed June 25, 1973, now U.S. Pat. No. 3,855,854.

BACKGROUND OF THE INVENTION

The present invention is directed to an impression packer and more particularly this invention is directed to an impression packer utilizing a mixture of partially cured synthetic nitrile rubber, natural rubber smoked sheet, silica powder and rubber processing oil rolled into sheet form for the impression receiving sleeve.

It is often very desirable to know the condition of pipe or liners located in wells. For example, it is important to know whether or not perforations or slots in a liner are open or plugged. It is also often important to know the condition of the pipe or liner itself, i.e., is it in good condition or is it cracked or split. It is also sometimes desirable to know what the surface of a formation penetrated by a well is like.

One means of determining the condition of these downhole occurrences is the use of an impression packer. An impression packer is a device which is run down hole and has a surface which is pressed against the pipe or formation which surface will form and retain an impression of irregularities in the surface of the pipe such as, for example, perforations or cracks in the pipe. Impression packers are not new. Such packers are disclosed in U.S. Pat. Nos. 2,416,441; 2,618,014; and 2,653,474, for example. However, impression packers known heretofore had only limited success. A principal cause of the lack of success is believed to be the absences of a suitable material for receiving and retaining the impression.

The present invention provides a material for forming an impression sleeve of an impression packer. The impression sleeve is formed of a material which will retain impressions and which will expand and retract so that an impression may be made and then so the packer may be removed from the well so the impression may be examined. The material used to form the impression sleeve must be smooth so that impression detail will be readily observable on the sleeve after a run of the impression packer. That is, the surface of the impression sleeve must not be so rough that detail of the impression is lost. Generally a surface which feels smooth to the hand and visually appears to have no major roughness is required.

BRIEF DESCRIPTION OF THE PRESENT INVENTION

The present invention provides a material useful as an impression sleeve of an expandable and retractable packer which sleeve will form and retain an impression of irregularities in a downhole surface. The material is formed of a mixture of partially cured synthetic nitrile rubber, natural rubber smoked sheet, hydrated amorphous silica powder and rubber processing oil. The partial cure of the synthetic nitrile rubber is done by heating nitrile rubber containing less than full curing amounts of sulfur, stearic acid and zinc oxide, the curing chemicals. Broadly, a mixture containing from about 60 to 80% by weight of partially cured synthetic nitrile rubber including the cure chemicals, from about 10 to 20% natural rubber smoked sheet, from about 5 to 15% by weight of hydrated amorphous silica powder, and from about 2 to 6% by weight of rubber processing oil has been found satisfactory. A particularly desirable impression sleeve has resulted when the mixture comprises from about 70 to 75% by weight of partially cured synthetic nitrile rubber including the cure chemicals, from 14 to 16% by weight of natural rubber smoked sheet, about 7.5 to 8.5% by weight silica powder, and about 3.5 to 4.5% by weight rubber processing oil.

OBJECT OF THE INVENTION

A principal object of the present invention is to provide an oil resistant relatively temperature stable material for use as the impression sleeve of a packer for use in well operations to determine the condition of a downhole surface. Further objects and advantages of the present invention will become apparent from the following detailed description read in light of the accompanying drawing.

IN THE DRAWINGS

FIG. 1 is an elevation view with parts broken away for clarity of presentation and illustrates apparatus assembled in accordance with the present invention;

FIG. 2 is a sectional view taken at line 2—2 of FIG. 1; and

FIG. 3 is an enlarged partial elevation view and illustrates the impression element of the present invention in contact with a well liner.

DESCRIPTION OF THE PREFERRED EMBODIMENT

The preferred arrangement of apparatus of the present invention will now be described in detail with reference to the drawings and to FIGS. 1 to 3 in particular. The apparatus of the present invention provides an inflatable impression packer useful in well operations. The packer includes a tubular mandrel section having a resilient inflatable sleeve and an impression sleeve connected thereto. When inflated the impression sleeve expands and sealingly engages the inside of a well and conforms with irregularities therein. After a predetermined time period the packer is deflated and the impression sleeve is retracted. However, the impression on the sleeve remain intact and may be investigated when the packer is returned to the surface.

The packer is illustrated inside of well liner 22. The liner 22 is used to line the wall of the well as is known in the art and may contain an opening such as opening 23 which opens communication with a formation behind the liner 22. An inflatable resilient sleeve 10 is connected at its upper and lower ends in fluid-tight relationship to an elongated tubular mandrel Section 12. The connection is made in any suitable manner such as, for example, by clamping units indicated by the numerals 14 and 16. An impression sleeve 11 is connected to the resilient sleeve 12 and is expandable and retractable therewith. The impression sleeve is adapted to form and retain an impression record of a surface against which it is pressed.

The tubing section 12 extends through the clamping units 14 and 16. The upper end of the tubing 12 is usually connected into a segmented tubing string which extends to the top of the well. If desired, however, the tubing section may be connected through an appropriate linkage system to a wireline. In this event suitable inflation devices for inflating the inflatable element are run into the well with the tubing section on the wireline. When the tubing section is run into the well on a segmented tubing string the resilient sleeves 10 and 11 can be inflated by flowing a fluid down the interior of the tubing string into the tubing section and then through the tubing section through suitable holes 20 and 21 therein provided.

In preferred form the lower end of the tubing section 12 is connected to a float shoe 24 by means of an intermediate sub 26. The float shoe 24 has a plurality of holes 28 to permit entry of well fluids into the interior of the shoe 24. An upwardly opening check valve, such as flapper valve 30, is located in the float shoe 24 above the holes 28. When the flapper valve is open well fluids can communicate with the interior of the tubing section 12 and the tubing connected thereabove. When well liquids are encountered when the inflatable packer of the present invention is being run into a well on a segmented tubing string the flapper valve 30 opens to permit entry of the well fluids into the interior of the tubing section 12 and the tubing string. This equalizes the pressure on the interior and the exterior of the packer and permits later inflation of the inflatable resilient sleeves 10 and 11 by means of a relatively small pressure differential. This is so because the pressure needed to inflate the resilient sleeve does not need to overcome the well pressure.

When fluid is injected into the tubing section from above to apply pressure to the inflatable resilient sleeve the flapper valve is closed by the pressure and the sleeve is expanded by means of flow into the annular chamber 15 between the tubing section 12 and the inner resilient sleeve 10. Even though a column of well liquids may extend up the interior of the tubing and into the annular chamber 15 the packer is still inflated by pressurizing the tubing string from the surface. The pressure differential in the annular chamber forces the impression sleeve to sealingly engage the well wall. When sufficient time has passed for the impression record to be formed on the impression sleeve the pressure is released and the impression sleeve is retracted and moves away from sealing engagement with the well wall. The retraction of the impression sleeve is preferably caused by the resiliency of the inflatable resilient sleeve. If desired springs or other devices may be utilized to retract the impression sleeve, for example, as taught in U.S. Pat. No. 2,692,446. In any event the impression sleeve is retracted enough so that the packer may be pulled from the well without destroying the impressions formed thereon. After the impression packer operation is completed a drain port is opened below the tubing section 12 to allow the interior of the tubing to drain as the tubing is being withdrawn from the well. Thus knock-off plug 32 is positioned in the adapter sub 26. A sinker bar (not shown) is used to shear off the back of the plug 32 to open communication from the inside of the tubing to the well annulus.

The inner inflatable sleeve 10 of the packer is connected at its upper and lower ends in fluid-tight relationship by clamping units 14 and 16. Preferably as fully described in copending application Ser. No. 367,602, filed June 6, 1973, now U.S. Pat. No. 3,889,749. by Stanley O. Hutchison, the clamping units 14 and 16 disconnectably connect the flexible sleeve 10 in position over the tubing section 12. The disconnectable connection provided by the clamping units permits easy field repair or "dressing" of the packer. Thus if the ends of the sleeve 10 and 11 wear or abrade near the clamping units then one or more of the clamps is opened and the worn end or ends of the sleeve or sleeves trimmed off. The sleeve is then reconnected into the clamping unit.

The impression sleeve is formed of a material which will retain impressions and will expand and retract with the expansion and retraction of the inflatable resilient sleeve. The material used to form the impression sleeve must be smooth so that impression detail will be readily observable on the sleeve after a run of the impression packer. That is, the surface of the impression sleeve must not be so rough that detail of the impression is lost. Generally a surface which feels smooth to the hand and visually appears to have no major roughness is required. In applications where some exposure to petroleum is a factor and operations at elevated temperatures is required, a mixture of partially cured synthetic nitrile rubber, natural rubber smoked sheet and certain additives has been found to give good results.

The material useful as an impression sleeve in accordance with the present invention is a mixture of partially cured synthetic nitrile rubber, natural rubber smoked sheet, hydrated amorphous silica powder and rubber processing oil. Broadly, a mixture containing from about 60 to 80% by weight of partially cured synthetic nitrile rubber, about 10 to 20% by weight of natural rubber smoked sheet, from about 5 to 15% by weight of hydrated amorphous silica powder, and from about 2 to 6 % by weight of rubber processing oil has been found satisfactory. In all instances the weight percent of the partially cured nitrile rubber includes the weight of the cure chemicals. Best results are obtained when the impression material is formed of a mixture comprising about 70 to 75% by weight partially cured synthetic nitrile rubber, about 14 to 16% by weight natural rubber smoked sheet, 7.5 to 8.5% by weight amorphous silica powder, and about 3.5 to 4.5% by weight of rubber processing oil. A particularly desirable impression sleeve has resulted when the mixture comprises about 72.4% partially cured synthetic nitrile rubber, about 15.7% by weight of natural rubber smoked sheet, about 7.9% by weight silica powder and about 4.0% by weight of rubber processing oil.

The impression sleeve material is formed by mixing the above mentioned ingredients in the proper ratios. Preferably, the mixing is accomplished in two stages. The first stage results in the formation of a natural rubber sheet having desired amounts of silica powder and rubber processing oil contained therein. The first stage rubber sheet should contain natural rubber smoked sheet 50 to 75% by weight, hydrated amorphous silica powder 10 to 30% by weight and rubber processing oil 3 to 15% by weight. A highly preferred first stage is formed of natural rubber smoked sheet 57.2% by weight, hydrated amorphous silica powder 28.4% by weight, and rubber processing oil 14.4% by weight. The second stage mixing is accomplished by mixing the above described first stage rubber sheet with a predetermined amount partially cured nitrile rubber to give the desired ratios in accordance with this invention.

The first stage mixing is preferably accomplished by first introducing a known weight of natural rubber smoked sheet into a rubber processing rolling mill. As known in the art, a rubber processing rolling mill usually comprises two parallel adjustable counterrotating rolls rotating at slightly different speeds. Rubber is fed between the rolls and the squeezing and friction caused by the differential speeds of the rolls heats and breaks the nerve of the rubber causing it to smooth out and form a relatively thin coating around one of the rolls. The thickness of the sheet can be adjusted within limits by proper spacing of the rollers and the amount of rubber introduced into the rolls.

After an initial period of rolling which is generally accomplished in about 15 to 20 minutes sufficient heat and friction are generated to reduce the nerve or resiliency of the natural rubber to cause it to form a sheet on one of the rolls. The desired weights of the additives are then added to the rubber as it is being rolled. To facilitate mixing, the rubber sheet is continually cut off the roll and re-rolled during the mixing period. This results in thorough mixing and squeezing of the rubber and the additives and eventually a smooth rubber sheet of the mixture is formed around one of the rolls. A time of about 15 to 20 minutes is generally sufficient to mix the rubber and the additives to form a suitable first stage material. After such a sheet has been formed on one of the rolls the sheet is cut and removed from the roll.

The second stage mixing is accomplished by first feeding into the set of rubber rolls a known weight of partially cured nitrile rubber and rolling the nitrile rubber until the nerve is broken and a rubber sheet is formed about one of the rolls. This usually requires about 15 to 20 minutes. Pieces of the first stage sheet are then added to the rolls to combine with the second stage sheet in the moving rolls. Sufficient first stage sheet is added to form an impression cover material in sheet form having the herein disclosed proportions by weight. At such time which may be about 15 to 20 minutes the sheet of material is cut and removed from the rolls.

The sheet of impression material is allowed to cool. It is then ready to be connected to an inflatable sleeve of a packer to form an impression sleeve in accordance with the present invention. The size of the sheet, of course, may be rolled to conform with the size of an impression sleeve it is desired to make or the sheet taken from the rolls may be cut into suitable strips and run through and extruder to get a continuous sheet of desired length. For example, is one demonstration small rolls having a circumference of only 3 to 5 feet were used to produce an impression material sheet. It was desired to use a continuous sheet of 30 feet in length by 16 inches in width by 0.150 inch in thickness for forming an impression sleeve. The impression material formed on the small rolls was cut into narrow strips and run through an extruder to get a 30 foot long continuous sheet.

The so formed impression sheet is connected to an inflatable sleeve of a packer to form an impression surface. When using a rubber inflatable sleeve it has been found satisfactory to bond the impression sheet to the inflatable sleeve with rubber adhesive. The preferred manner to bond the layers together comprises coating one side of the impression sheet with rubber adhesive such as, for example, Rubatex No. 372 (a rubber adhesive of Rubatex Corp., Bedford, Va. 24523) and allowing it to dry until slightly tacky. During the drying period the outside of the inflatable sleeve is also coated with the rubber adhesive. The impression sheet is then smoothly contacted with the inflatable sleeve with about a 1 inch overlap to thus form the impression sleeve.

The synthetic nitrile rubber of the present invention is of high nitrile content. Nitrile rubbers are the result of copolymerization acrylonitrile and butadiene. High nitrile content generally means that the acrylonitrile content is 37% or higher. A suitable high nitrile rubber for use in the present invention is sold by Goodyear under the trade designation CHEMIGUM N-318B.

The nitrile rubber of the present invention is partially cured to provide for better temperature stability when the impression sleeve is used in high temperature wells. The rubber is only partially cured, however, since fully cured rubber will not combine with the other constitutents to form a usable impression material. The chemicals used in the partially curing process are sulfur, stearic acid and zinc oxide. As is known in the art to obtain a full cure of rubber a known amount of cure chemicals is mixed with the rubber and the mixture is heated a suitable amount. Curing times for curing nitrile rubber range from 30 minutes at 305°F to 1 at 400°F. A full cure can be obtained in 15 to 20 minutes at 340°F. Cure chemicals per 100 parts by weight of nitrile rubber to achieve to full cure are:

1.5 parts by weight sulfur
1.0 parts by weight of stearic acid
5.0 parts by weight zinc oxide In accordance with the invention these cure chemicals are used in an amount less than the above noted full cure amounts. Thus these cure chemicals are used in an amount at least one-third to up to about three-quarters that used in a full cure. Thus, per 100 parts by weight of nitrile rubber there should be at least 0.5 parts by weight sulfur, 0.3 parts by weight stearic acid, and 1.6 parts by weight zinc oxide and no more than 1.125 parts by weight sulfur, 0.75 parts be weight stearic acid, and 3.75 parts by weight zinc oxide. Preferably the cure chemicals are present in an amount of from about one-half to two-thirds that of the full cure chemicals. Thus the cure chemicals per 100 parts by weight of nitrile rubber preferably range between 0.75 to 1.0 parts by weight sulfur, 0.50 to 0.60 parts by weight stearic acid, and 2.50 to 3.20 parts by weight zinc oxide.

Curing is accomplished by first introducing a known weight of uncured synthetic nitrile rubber into a rubber processing mill. The rubber is fed between the two counterrotating rolls and the squeezing and friction caused by the rolls heats and breaks the nerve of the rubber causing it to smooth out and form a coating around one of the rolls. Suitable amounts of cure chemicals as described above are then added to the rubber on the rolls and thoroughly mixed with the rubber. The rubber is then removed from the rolls and heated for example in a steam chamber to the desired cure temperature for the curing time to effect a partial cure of the rubber. In accordance with the invention 15 to 20 minutes at 340°F has been found suitable for such curing.

The natural rubber useful in accordance with the present invention is classified as smoked sheet natural rubber. As noted at page 19 of the Vanderbilt Rubber Handbook published by R. T. Vanderbilt Company, Inc., 230 Park Avenue, New York, N.Y. 10017, there are seven types of natural rubber available in the market. Each type is classified according to the preparation given the rubber and the source of the rubber. Smoked sheet is formed of coagulated rubber sheets properly dried and smoked. There are seven grades of smoked sheet available ranging from highest quality No. 1XRSS to lowest quality No. 6 RSS. Although under some conditions any of these grades may be employed in the present invention, it is usually preferred to use at least grade 1 RSS or better.

The silica powder used in accordance with the invention is hydrated amorphous silica. A preferred silica powder is sold under the trade name HIGH SIL 210 and is produced by Chemical Division of Pittsburgh Plate Glass Co. The function of the silica powder is to smooth out the surface of the rubber. Powder fills the pores of the rubber and provides a smooth surface on which impressions are clearly visible. When present in the final rubber nitrile rubber — natural rubber mixture in suitable proportions, the silica powder provides a desirable smooth finish without causing the rubber to be undesirably hard.

The liquid processing oil is useful as a plasticizer and may be one of the plasticizers normally used in the rubber industry. These include mineral oil and other liquid hydrocarbons and various synthetic oils. The preferred liquid processing oil for use in the present invention is a hydrocarbon based material produced by the Golden Bear Oil Company of Bakersfield, Calif., and sold under the trade and identification of LPO.

A number of Demonstrations were conducted to determine the optimum impression material for use in high temperature wells. Generally, sheets of rubber having the compositions set out in each of the Demonstrations were formed and tested as impression material. The best results were found using the composition and technique set out in Demonstration 2. The compositions of Demonstrations 1, 2 and 4 showed increased temperature stability. The results achieved in the other 17 Demonstrations were not deemed acceptable for one or more reasons; usually because the resulting composition was not suitable from a temperature standpoint.

DEMONSTRATION 1

A mixture of partially cured nitrile rubber, natural rubber, silica powder and liquid processing oil was prepared in sheet form. The composition of the finished sheet was:

|  | Actual lbs. | Parts | Weight % |
|---|---|---|---|
| Chemigum N-318B nitrile rubber | 5.0 | 100.0 | 70.23 |
| Sulfur | 0.025 | 0.5 | .35 |
| Stearic acid | 0.015 | 0.3 | .21 |
| Zinc oxide | 0.08 | 1.6 | 1.12 |
| Natural rubber | 1.14 | 22.8 | 16.02 |
| Silica powder | 0.57 | 11.4 | 8.00 |
| Liquid processing oil | 0.29 | 5.8 | 4.07 |
|  | 7.12 | 142.4 | 100.00 |

The cure chemicals were present in the nitrile rubber in ⅛ normal cure amount. The nitrile rubber was cured 15 minutes at 340°F prior to being mixed with the first stage rubber mix of natural rubber, silica powder and liquid processing oil. The final sheet was tested and showed temperature stability.

DEMONSTRATION 2

Material prepared as in 1 and had the following composition:

|  | Actual lbs. | Parts | Weight % |
|---|---|---|---|
| Chemigum N-318B rubber | 5.00 | 100.0 | 69.07 |
| Sulfur | 0.05 | 1.0 | .69 |
| Stearic acid | 0.03 | 0.6 | .41 |
| Zinc oxide | 0.16 | 3.2 | 2.20 |
| Natural rubber | 1.14 | 22.8 | 15.75 |
| Silica powder | 0.57 | 11.4 | 7.88 |
| Liquid processing oil | 0.29 | 5.8 | 4.00 |
|  | 7.24 | 144.8 | 100.00 |

The cure chemicals were present in an amount equal to ⅔ of the normal full cure amount. Curing was done at 340°F for 15 minutes. This was the best compound - has good oil resistance and temperature stability.

DEMONSTRATION 3

Material prepared as in 1 and had the following composition:

|  | Actual lbs. | Parts | Weight % |
|---|---|---|---|
| Chemigum N-318B nitrile rubber | 5.00 | 100.00 | 67.24 |
| Sulfur | 0.0375 | 0.75 | 0.50 |
| Stearic acid | 0.025 | 0.50 | 0.33 |
| Zinc oxide | 0.125 | 2.50 | 1.68 |
| Baracril OZO | 0.25 | 5.00 | 3.36 |
| Natural rubber | 1.14 | 22.80 | 15.34 |
| Silica powder | 0.57 | 11.40 | 7.60 |
| Liquid processing oil | 0.29 | 5.80 | 3.80 |
|  | 7.44 | 148.75 | 100.00 |

The cure chemicals were present in ½ full cure amount. However, Paracril OZO was also used. Paracril OZO is a trademark of Uniroyal, Inc. for a nitrile rubber and vinyl blend. The mixture was cured at 340°F for 20 minutes. The resultant sheet had excellent finish but was not temperature stable.

DEMONSTRATION 4

Material prepared as in 1 to form a sheet having the following composition:

|  | Actual lbs. | Parts | Weight % |
|---|---|---|---|
| Chemigum N-318B nitrile rubber | 5.000 | 100.00 | 69.56 |
| Sulfur | 0.0375 | 0.75 | 0.52 |
| Stearic acid | 0.0250 | 0.50 | 0.35 |
| Zinc oxide | 0.1250 | 2.50 | 1.74 |
| Natural rubber | 1.14 | 22.80 | 15.86 |
| Silica powder | 0.57 | 11.40 | 7.93 |
| Liquid processing oil | 0.29 | 5.80 | 4.04 |
|  | 7.1875 | 143.75 | 100.00 |

The acceptable cure chemicals were present in ½ full cure amount and curing was done for 20 minutes at 340°F. The resulting sheet had fair temperature stability but not as good as Demonstration 2.

DEMONSTRATION 5

A rubber sheet was prepared by mixing the following components on a rubber mill:
 75% Goodrich HyCar 1072 nitrile rubber
 25% Goodyear NatSyn 400 – synthetic poly isoprene rubber Good nerve. Fair finish. Slick but not tacky after contact with gasoline. However, is not temperature stable.

DEMONSTRATION 6

Mixture of Demonstration 5 tended to stick to rolls and to try to improve millability the following components were added to 5 lbs. of above mixture:
1 lb. silica powder
0.2 lbs. paraffin
3.5 lbs. liquid processing oil
Material became very sticky and had to be stripped from the rolls.

DEMONSTRATION 7

Goodrich Ethylene Propylene 587 G-1 rubber. (Very hard material - very difficult to mill initially.) Would not mill into an impression sheet.
Added 20% by weight Goodyear NatSyn 400 -- synthetic poly isoprene rubber. Less nerve than nitrile rubbers tested, rough finish and more sensitive to gasoline and poor temperature stability.

DEMONSTRATION 8

A sheet was formed on a rubber mill having the following composition:
80% Goodrich EP 587 G-1 rubber
20% natural rubber
Nerve about same as Demonstation 7, rougher finish than 7, slightly more gasoline sensitive than Demonstration 7 blend above and poor temperature stability.

DEMONSTRATION 9

A sheet of the following composition was formed:

|  | Actual lbs. | Weight % |
|---|---|---|
| Chemigum N-318B nitrile rubber | 5.0 | 100.0 | 70.23 |
| Sulfur | 0.025 | 0.5 | 0.35 |
| Stearic acid | 0.015 | 0.3 | 0.21 |
| Zinc oxide | 0.08 | 1.6 | 1.12 |
| Natural rubber | 1.14 | 22.8 | 16.02 |
| Silica powder | 0.57 | 11.4 | 8.00 |
| Liquid processing oil | 0.29 | 5.8 | 4.07 |
|  | 7.12 | 142.4 | 100.00 |

Milled mixture on rubber mill and then cured total mixture for 15 minutes at 340°F. After the cure material was remilled to a smooth finish and had good gasoline resistance but lacked temperature stability.

DEMONSTRATION 10

Attempted to prepare Thiokol FA Polysulfide on rubber mill. It was very sticky on rolls. Would not mill into sheet. Good gasoline resistance. Tried to smooth finish by adding 0.03 lbs. MBTS and 0.01 lbs. DPG. Still very sticky. Added 2.0 lbs. NatSyn 400. Very, very sticky. Added 0.05 lbs. stearic acid. About like putty. Hand stripped material from the mill rolls.

DEMONSTRATION 11

Mixture having the following composition was prepared:

|  | Actual lbs. | Parts | Weight % |
|---|---|---|---|
| Chemigum H-318B nitrile rubber | 5.0 | 100.00 | 69.64 |
| Sulfur | 0.05 | 0.25 | 0.17 |
| Stearic acid | 0.03 | 0.15 | 0.11 |
| Zinc oxide | 0.16 | 3.20 | 2.23 |
| MatSyn synthetic rubber 400 | 1.14 | 22.80 | 15.87 |
| Silica powder | 0.57 | 11.40 | 7.94 |
| Liquid processing oil | 0.29 | 5.80 | 4.04 |
|  | 7.24 | 143.60 | 100.01 |

Nitrile rubber was cured 15 minutes at 340°F using ⅔ full cure chemicals prior to mixing NatSyn synthetic 400 rubber mix. Material milled easy and had a smooth finish. Gasoline test slick but not tacky. Not temperature stable.

DEMONSTRATION 12

The following material was prepared:

|  | Actual lbs. | Parts | Weight % |
|---|---|---|---|
| EnJay Vistalon 2504 ethylene propylene | 5.000 | 100.0 | 69.20 |
| Zinc oxide | 0.125 | 2.5 | 1.73 |
| Stearic acid | 0.025 | 0.5 | 0.35 |
| Sulfur | 0.075 | 1.5 | 1.04 |
| Cured 20 minutes at 340°F. Then milled with: | | | |
| Natural rubber | 1.14 | 22.8 | 15.78 |
| Silica powder | 0.57 | 11.4 | 7.89 |
| Liquid processing oil | 0.29 | 5.8 | 4.01 |
|  | 7.225 | 144.50 | 100.00 |

Material has good nerve, very rough finish and good gasoline resistance but very temperature sensitive.

DEMONSTRATION 13

The following material was prepared:

|  | Actual lbs. | Parts | Weight % |
|---|---|---|---|
| Chemigum N-318B nitrile rubber | 5.00 | 100.0 | 67.23 |
| Paracril OZO | 0.25 | 5.0 | 3.38 |
| Sulfur | 0.0375 | 0.75 | 0.50 |
| Stearic acid | 0.025 | 0.50 | 0.50 |
| Zinc oxide | 0.125 | 2.50 | 1.68 |
| Cured 20 minutes at 340°F, then milled with: | | | |
| Natural rubber | 1.14 | 22.8 | 15.33 |
| Silica powder | 0.57 | 11.4 | 7.66 |
| Liquid processing oil | 0.29 | 5.8 | 3.90 |
|  | 7.4375 | 148.75 | 100.00 |

Excellent smooth finish. Good elasticity. Gasoline test -- slick but not tacky. However, not temperature stable.

DEMONSTRATION 14

The following material was prepared:

|  | Actual lbs. | Parts | Weight % |
|---|---|---|---|
| Goodrich EP 587-G1 ethylene propylene rubber | 10.0 | 100.0 | 94.38 |
| Zinc oxide | 0.33 | 3.3 | 3.11 |
| Stearic acid | 0.066 | 0.66 | 0.62 |
| Sulfur | 0.20 | 2.0 | 1.89 |
|  | 10.60 | 105.96 | 100.00 |

5 lbs. of above mixture cured at 340°F for 20 minutes. Then milled with 2 lbs. first stage natural rubber mixture. Could not form sheet.

The other 5 lbs. of the mixture was mixed with 0.10 lbs. of Paracril OZO and cured 20 minutes at 340°F, then blended with 2 lbs. of first stage natural rubber mixture. Milled easier than above but still too rouch for impression sheet.

Added an additional 1.0 lbs. of first stage natural rubber mix to above but still too rough for impression sheet.

DEMONSTRATION 15

The following mixture was prepared:

|  | Actual lbs. | Parts | Weight % |
|---|---|---|---|
| Chemigum N-318B nitrile rubber | 10.0 | 100.0 | 65.04 |
| Zinc oxide | 0.5 | 5.0 | 3.25 |
| Stearic acid | 0.2 | 2.0 | 1.30 |
| Cumar MH 2.5 (synthetic resin) | 0.75 | 7.5 | 4.88 |
| Silica powder | 3.00 | 30.0 | 19.51 |
| Dibutyl phthalate | 0.75 | 7.5 | 4.88 |
| Sulfur | 0.175 | 1.75 | 1.14 |
|  | 15.375 | 153.75 | 100.00 |

Cured 20 minutes at 340°F in 2 – 5 lb. batches, then tried to mill into a sheet. Would not band on the mill. Too much cure.

Milled the second 5 lb. batch with 2 lbs. of first stage natural rubber mix. Could not mill into an acceptable impression cover sheet.

DEMONSTRATION 16

The following material was prepared:

|  | Actual lbs. | Parts | Weight % |
|---|---|---|---|
| Chemigum N-318B nitrile rubber | 10.0 | 100.0 | 91.08 |
| Sulfur | 0.10 | 1.0 | 0.91 |
| Stearic acid | 0.06 | 0.6 | 0.55 |
| Zinc oxide | 0.32 | 3.2 | 2.91 |
| Paracril OZO | 0.20 | 2.0 | 1.82 |
| Cumar MH 2.5 (synthetic resin) | 0.30 | 3.0 | 2.73 |
|  | 10.98 | 109.8 | 100.00 |

Through an error the 2 –5 lb. batches were cured 60 minutes at 340°F instead of the desired 20 minutes. This resulted in too much cure. Attempts to mill with 2 lbs. and 3 lbs. of first stage natural rubber mix were unsatisfactory.

DEMONSTRATION 17

The following mixture was prepared:

|  | Actual lbs. | Parts | Weight % |
|---|---|---|---|
| Chemigum N-318B nitrile rubber | 3.48 | 100.00 | 60.94 |
| Sulfur | .026 | 0.74 | 0.45 |
| Stearic acid | .018 | 0.52 | 0.32 |
| Zinc oxide | .087 | 2.50 | 1.52 |
| Natural rubber | 1.20 | 34.48 | 21.01 |
| Silica powder | 0.60 | 17.24 | 10.51 |
| Liquid processing oil | 0.30 | 8.62 | 5.25 |
|  | 5.711 | 164.10 | 100.00 |

The above composition was milled with an additional 0.71 lbs. of first stage natural rubber mixture to check the effect of more natural rubber. The resultant material had excellent finish and good nerve and was slick but not tacky after gasoline application. However, not temperature stable.

DEMONSTRATION 18

The following composition was prepared:

|  | Actual lbs. | Parts | Weight % |
|---|---|---|---|
| Chemigum N-318B nitrile rubber | 5.0 | 100.0 | 66.78 |
| Sulfur | 0.0375 | 0.75 | 0.50 |
| Stearic acid | 0.025 | 0.50 | 0.33 |
| Zinc oxide | 0.125 | 2.50 | 1.67 |
| Cumar MH 2.5 (synthetic resin) | 0.30 | 6.00 | 4.01 |

Cured 20 minutes at 340°F then milled with 2 lbs. of first stage natural rubber mix.

| Natural rubber | 1.14 | 22.8 | 15.23 |
|---|---|---|---|
| Silica powder | 0.57 | 11.4 | 7.61 |
| Liquid processing oil | 0.29 | 5.8 | 3.87 |
|  | 7.4875 | 149.75 | 100.00 |

Excellent finish. Good nerve and gasoline resistance. However, not temperature stable.

DEMONSTRATION 19

The following composition was prepared:

|  | Actual lbs. | Parts | Weight % |
|---|---|---|---|
| Chemigum N-318B nitrile rubber | 4.01 | 100.0 | 58.53 |
| Sulfur | .03 | 0.75 | 0.44 |
| Stearic acid | .02 | 0.50 | 0.29 |
| Zinc oxide | .10 | 2.49 | 1.46 |
| Cumar MH 2.5 (synthetic resin) | .24 | 5.99 | 3.51 |
| Natural rubber | 1.39 | 34.67 | 20.29 |
| Silica powder | 0.71 | 17.71 | 10.37 |
| Liquid processing oil | 0.35 | 8.73 | 5.11 |
|  | 6.85 | 170.84 | 100.00 |

Material had excellent finish, good nerve and gasoline resistance. However, not temperature stable.

In operation the inflatable impression packer is first run into a well to a position adjacent the surface to be investigated. Fluid is forced into the annular chamber 15 to expand the inner resilient sleeve 10 and the outer impression sleeve 11. As noted in FIG. 3 the impression sleeve 11 will deform into an opening such as slot 23, and a projection 34 which is an impression of the slot, will form. Generally it is desirable to apply a differential pressure in the packer of at least about 100 psi above the wellbore pressure where the packer is being inflated. That is the differential pressure on the pressurizing fluid should be maintained at at least 100 psi for about ten minutes. Rarely are pressures in excess of 150 psi when using the impression material of the present invention. The impression sleeve is useful in wells having temperatures up to about 200°F.

Thus in summary the present invention provides an inflatable impression packer for use in wells. A material is used in forming the impression sleeve which combines desirable qualities of resiliency nd memory so as to record and retain impressions as well as to be capable of expansion and retraction.

Although certain preferred embodiments of the present invention have been herein described in order to provide an example of its construction and steps sufficient for usage by those skilled in the art, it is to be understood that various changes and innovations in the structure described can be effected without departure from the basic principles of the invention. Changes and revisions of this sort which continue to rely on these principles are therefore deemed to be circumscribed by the spirit and scope of the appended claims.

We claim:

1. An impression material for use in an impression packer comprising a smooth rolled sheet containing about 60 to 80% by weight partially cured synthetic nitrile rubber including cure chemicals, said nitrile rubber being a butadiene crylonitrile co-polymer and said cure chemicals comprising sulfur, stearic acid and zinc oxide present in an amount from about one-third to three-fourths the amount of said chemicals required for full cure, about 10 to 20% by weight natural rubber smoked sheet, about 5 to 15% by weight hydrated amorphous silica, and about 2 to 6% by weight of rubber processing oil.

2. The impression material of claim 1 further characterized in that the partial cure chemicals, are present in an amount per 100 parts by weight of nitrile rubber, between 0.75 to 1.0 parts by weight sulfur, 0.50 to 0.60 parts by weight stearic acid and 2.50 to 3.20 parts by weight zinc oxide.

3. An impression material for use in an impression packer comprising a smooth rolled sheet containing about 70 to 75% by weight partially cured synthetic nitrile rubber including cure chemicals, said nitrile rubber being a butadiene acrylonitrile co-polymer and said cure chemicals comprising sulfur, stearic acid and zinc oxide present in an amount from about one-third to three-fourths the amount of said chemicals required for full cure, about 14 to 16% by weight natural rubber smoked sheet, about 7.5 to 8.5% by weight hydrated amorphous silica, and about 3.5 to 4.5% by weight of rubber processing oil.

4. The impression material of claim 3 further characterized in that the partial cure chemicals are present in an amount per 100 parts by weight of nitrile rubber, between 0.75 to 1.0 parts by weight sulfur, 0.50 to 0.60 parts by weight stearic acid and 2.50 to 3.20 parts by weight zinc oxide.

5. An impression material for use in an impression packer comprising a smooth rolled sheet containing about 72.4% by weight partially cured synthetic nitrile rubber including cure chemicals, said nitrile rubber being a butadiene acrylonitrile co-polymer and said cure chemicals comprising sulfur, stearic acid and zinc oxide present in an amount from about one-third to three-fourths the amount of said chemicals required for full cure, about 15.7% by weight natural rubber smoked sheet, about 7.9% by weight hydrated amorphous silica, and about 4.0% by weight of rubber processing oil.

6. The impression material of claim 5 further characterized in that the cure chemicals consist of 1.0 parts by weight sulfur, 0.6 parts by weight stearic acid and 3.2 parts by weight zinc oxide, all per 100 parts by weight nitrile rubber.

7. A method of forming a sheet for use as an impression sleeve on an impression packer comprising forming a first stage rubber sheet containing natural rubber smoked sheet 50 to 75% by weight, silica powder 10 to 30% by weight, and rubber processing oil 3 to 15% by weight; partially curing an amount of synthetic nitrile rubber in the presence of cure chemicals, said nitrile rubber being a butadiene acrylonitrile co-polymer and said cure chemicals comprising sulfur, stearic acid and zinc oxide present in an amount from about one-third to three fourths the amount of said chemicals required for full cure; and mixing an amount of the said first stage rubber sheet and the partially cured synthetic nitrile rubber including cure chemicals contained therewith in a predetermined ratio to form a sheet of impression material containing about 60 to 80% by weight partially cured synthetic nitrile rubber including cure chemicals, about 10 to 20% by weight natural rubber smoked sheet, about 5 to 15% by weight silica powder, and about 2 to 6% by weight of rubber processing oil.

8. The method of claim 7 further characterized in that the first stage rubber sheet and the partially cured nitrile rubber are mixed in a ratio to form an impression sheet containing about 70 to 75% by weight partially cured synthetic nitrile rubber including cure chemicals, about 14 to 16% by weight natural rubber smoked sheet, about 7.5% to 8.5% by weight silica powder, and about 3.5 to 4.5% by weight of rubber processing oil.

9. The method of claim 7 further characterized in that the first stage rubber sheet and the partially cured nitrile rubber are mixed in a ratio to form an impression sheet containing about 72.4% by weight partially cured synthetic nitrile rubber including cure chemicals, about 15.7% by weight natural rubber smoked sheet, about 7.9% by weight silica powder, and about 4.0% by weight of rubber processing oil.

10. The method of claim 7 further characterized in that the partial cure chemicals are present in an amount per 100 parts by weight of nitrile rubber, between 0.75 to 1.0 parts by weight sulfur, 0.50 to 0.60 parts by weight stearic acid and 2.50 to 3.20 parts by weight zinc oxide.

11. The method of claim 8 further characterized in that the partial cure chemicals are present in an amount per 100 parts by weight of nitrile rubber, between 0.75 to 1.0 parts by weight sulfur, 0.50 to 0.60 parts by weight stearic acid and 2.50 to 3.20 parts by weight zinc oxide.

12. The method of claim 9 further characterized in that the cure chemicals consists of 1.0 parts by weight sulfur, 0.6 parts by weight stearic acid and 3.2 parts by weight zinc oxide, all per 100 parts by weight nitrile rubber.

* * * * *

UNITED STATES PATENT AND TRADEMARK OFFICE
CERTIFICATE OF CORRECTION

PATENT NO. : 3,963,654
DATED : June 15, 1976
INVENTOR(S) : STANLEY O. HUTCHISON ET AL It is certified that error appears in the above-identified patent and that said Letters Patent are hereby corrected as shown below:

Abstract

Col. 2, line 3, "curved" should read --cured--.

Claim 1

Col. 13, line 31, "crylonitrile" should read --acrylonitrile--.

Signed and Sealed this

Fifteenth Day of February 1977

[SEAL]

Attest:

RUTH C. MASON
*Attesting Officer*

C. MARSHALL DANN
*Commissioner of Patents and Trademarks*